(12) United States Patent
    Demon (10) Patent No.: US 9,883,633 B2
(45) Date of Patent: Feb. 6, 2018

(54) KNOTTER SYSTEM FOR A BALER

(71) Applicants: CNH BELGIUM N.V., Zedelgem (BE); CNH AMERICA LLC, New Holland, PA (US)

(72) Inventor: Frederik Demon, Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 311 days.

(21) Appl. No.: 14/436,157

(22) PCT Filed: Oct. 8, 2013

(86) PCT No.: PCT/EP2013/070929
§ 371 (c)(1),
(2) Date: Apr. 16, 2015

(87) PCT Pub. No.: WO2014/060245
PCT Pub. Date: Apr. 24, 2014

(65) Prior Publication Data
US 2015/0272011 A1     Oct. 1, 2015

(30) Foreign Application Priority Data
Oct. 16, 2012  (BE) .............................. BE2012/0697

(51) Int. Cl.
*A01F 15/14*     (2006.01)

(52) U.S. Cl.
CPC ................................ *A01F 15/145* (2013.01)

(58) Field of Classification Search
CPC ..................................................... A01F 15/145
See application file for complete search history.

(56) References Cited

U.S. PATENT DOCUMENTS

| | | | |
|---|---|---|---|
| 7,287,782 B2 | 10/2007 | Naeyaert | |
| 7,296,828 B2 | 11/2007 | Schoonheere et al. | |
| 8,590,945 B2 | 11/2013 | Schumacher et al. | |
| 9,226,453 B2 * | 1/2016 | Schoonheere | B65H 69/04 |
| 2006/0012176 A1 * | 1/2006 | Schoonheere | A01F 15/145 289/2 |
| 2014/0103647 A1 * | 4/2014 | Schoonheere | A01F 15/145 289/1.5 |

FOREIGN PATENT DOCUMENTS

DE          10206043 A1      8/2003

* cited by examiner

*Primary Examiner* — Shaun R Hurley
(74) *Attorney, Agent, or Firm* — Patrick M. Sheldrake (57) ABSTRACT

A knotter system has a bill hook, a twine receiver, a cutting arm and drive components. The twine receiver is adapted to let the twines slip during a second full rotation of the bill hook so that cutting of the twines is avoided when forming the second knot. The drive components can maintain the cutting arm in the extended position after the second rotation of the bill hook for a predetermined period which is sufficient to allow removal of the second knot from the bill hook.

13 Claims, 9 Drawing Sheets

KNOTTER SYSTEM FOR A BALER

This application is the US National Stage filing of International Application Serial No. PCT/EP2013/070929 filed on Oct. 8, 2013 which claims priority to Belgian Application BE2012/0697 filed Oct. 16, 2012, each of which is incorporated herein by reference in its entirety.

FIELD OF THE INVENTION

The present invention relates to a knotter system, and in particular to a knotter system for a baler for forming two consecutive knots during a single operation cycle.

BACKGROUND OF THE INVENTION

Rectangular bales are able to maintain their shape by means of a series of parallel extending twine loops, provided lengthwise around the bales. Balers typically use automatic knotters by which e.g. two knots are made on every loop for binding a bale. An example of such a knotter system for a baler is disclosed in EP 1.584.227 in the name of the Applicant, the disclosure of which is included herein by reference. The knotter system disclosed in EP 1.584.227 has the advantage that two consecutive knots can be formed during one operation cycle, without the formation of twine tails.

EP 1 645 509 relates to the holding device which is used in the knotter of a baler to grip hold twines as they are being knotted and cut. To establish a correct gripping and releasing, it is important to align all components to each other. EP 1 645 509 discloses that adjustment of the form of the curved edge of the holding device has a positive effect on the twines when being knotted and cut.

The object of the present invention is to further improve the knotter system of EP 1.584.227, and more in particular to realize a better and easier removal of the second knot from the bill hook at the end of an operation cycle.

SUMMARY OF THE INVENTION

According to an embodiment of the invention, the knotter system comprises a bill hook, a twine receiver for holding twines, a cutting arm adapted for cutting twines between the bill hook and the twine receiver and for sweeping a formed knot from the bill hook whilst moving between a rest position and an extended position. Further, the knotter system comprises a first drive means adapted to make the bill hook perform at least a first full rotation and a second full rotation and to move the cutting arm at least two times from the rest position to the extended position and back during a full operation cycle, to form respectively a first and second knot. The twine receiver is adapted to let the twines slip during the second full rotation of the bill hook so that cutting of the twines is avoided when forming the second knot. The first drive means are adapted to maintain the cutting arm in the extended position after the second rotation of the bill hook for a predetermined period which is such that the second knot is allowed to be removed from the bill hook without being hindered by the cutting arm moving back from the extended position to the rest position.

By allowing the twines to slip during the second full rotation of the bill hook, the cutting of the twines is avoided. However, in that way, the end parts of the twines extending out of the second knot, are longer and more difficult to remove from the bill hook. In order to make the removal from the bill hook, the cutting arm is maintained for a predetermined period in the extended position after the second rotation of the bill hook, so that the second knot can be removed without being hindered by the cutting arm moving back to the rest position.

According to a preferred embodiment, the bill hook comprises a lower lip, an upper lip and a positioning means for positioning the upper lip with respect to the lower lip. The positioning means are preferably adapted to move the upper lip away from the lower lip during the predetermined period. By moving the upper lip away from the lower lip during the predetermined period, the removal of the second knot from the bill hook is further ensured.

According to a preferred embodiment, the first drive means are adapted to make the bill hook perform a third full rotation during the operation cycle, and to maintain the cutting arm in the extended position during at least a first part of said third rotation. More preferably, the positioning means are adapted to move the upper lip away from the lower lip during at least said first part of the third rotation, so that it is guaranteed that the second knot is removed from the bill hook during the first part of the third full rotation of the bill hook.

According to a possible embodiment, the first drive means comprise a pinion and a first, second and third gear stretch provided along the circumference of a rotating disc. The pinion is adapted to cooperate with the first, second and third gear stretch for making the bill hook perform the first, second and third full rotation, respectively, when the disc is rotated. The disc is rotated around an axis which makes an angle with the axis of rotation of the bill hook. In that way, the existing knotter system can be easily adapted to make the third full rotation of the bill hook possible.

According to a possible embodiment, the first drive means further comprise a cam track and a cam follower. The cam follower is connected with the cutter arm. The cam track is preferably provided in the disc or in a member mounted for rotating synchronously with the disc. Preferably, the cam track is adapted for moving the cutting arm a first time from the rest position to the extended position and back, and a second from the rest position to the extended position and back during a full operation cycle. When moving the cutting arm for the second time from the rest position to the extended position, the cutting arm is held in the extended position during the predetermined period of time, in order to allow for the removal of the second knot.

According to a preferred embodiment, the twine receiver comprises a twine disc and a twine holder. The twine holder is adapted to clamp twines against the twine disc. The knotter system may further comprise second drive means adapted for rotating the twine disc during a first turn whilst clamping twines for forming the first knot, and for rotating the twine disc during a second turn whilst letting twines slip for the forming of the second knot.

According to a preferred embodiment, the twine disc is provided with at least a first and a second notch for receiving the twines. The twines are typically in the first notch during the first turn and in the second notch during the second turn. Note however that during the beginning of the second turn, end parts of the twines may still be in the first notch. However, during the forming of the second knot, the end parts will slip first out of the first notch and then out of the second notch.

According to a possible embodiment, the second notch is shaped in such a way that the twines are allowed to slip out of the second notch during forming of the second knot. According to another possible embodiment, the twine receiver is provided with biasing means for setting a bias for the clamping action by the twine holder. The biasing means may then be adapted to set a first bias during the first turn, and a second bias during the second turn. The first bias is chosen such that the twines are firmly clamped, while the second bias is chosen such that the twines are allowed to slip out of the twine receiver.

According to a preferred embodiment, the cutting arm is provided with a cutter and a removal means. The cutter is adapted for cutting twines between the bill hook and the twine receiver, whilst moving from the rest position to the extended position, and the removal means are adapted for sweeping twines from the bill hook whilst moving from the rest position to the extended position. Typically, the removal means have a shape which is complementary to the shape of the bill hook in order to facilitate the removal of the twines.

BRIEF DESCRIPTION OF THE DRAWINGS

The advantages of this invention will be apparent upon consideration of the following detailed disclosure of exemplary non-limiting embodiments of the invention, especially when taken in conjunction with the accompanying drawings wherein.

DETAILED DESCRIPTION OF THE PREFERRED EMBODIMENT

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, connection, processes and other means and components utilized in this invention are widely known and used in the field of the invention described, and their exact nature or type is not necessary for an understanding and use of the invention by a person skilled in the art, and therefore they will not be discussed in significant detail. Also, any reference herein to the terms "left" or "right" are used as a matter of mere convenience, and are determined by standing at the rear of the machine facing in its normal direction of travel.

Figure 1:
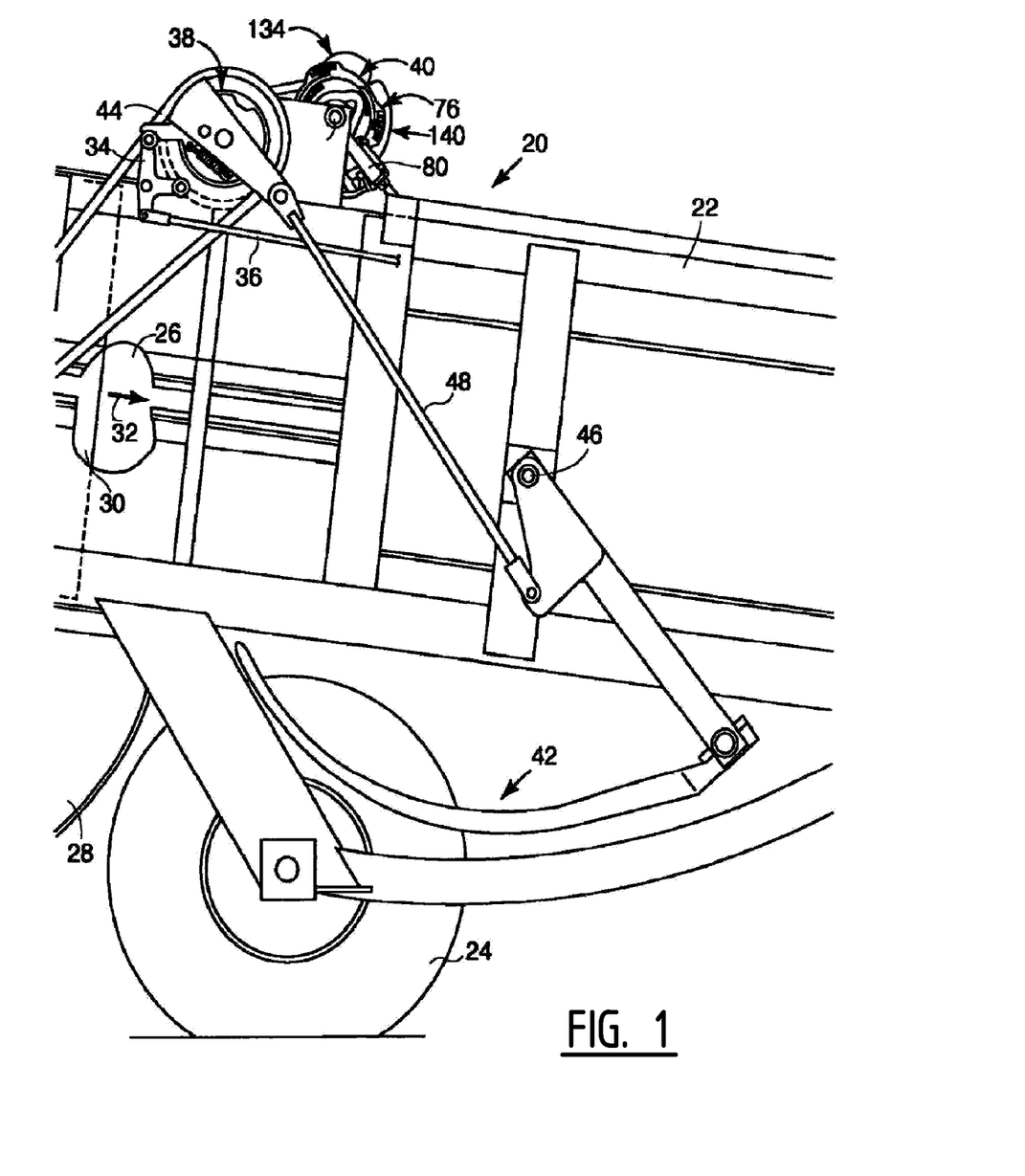
FIG. 1 is a fragmentary, side elevational view of a baler having a double knotter tying mechanism.

The baler 20 illustrated in FIG. 1 has a rectangular bale case 22 that is supported by ground wheels 24. The bale case 22 defines a bale chamber 26 wherein material is pushed in through a curved duct 28. A plunger 30 reciprocates within the bale case 22 to intermittently pack fresh charges of material from the duct 28 rearwardly in the chamber 26 in the direction of the arrow 32. When the bale reaches a predetermined size, a trigger 34 is pulled by a rod 36. This rod 36 engages a dog clutch 38, the clutch 38 in turn being connected to a tying mechanism 40 and a set of needles 42. As will be appreciated, the tying mechanism comprises a set of individual tying mechanisms or knotters 40 provided crosswise on top of the bale chamber 26 at intervals. Each knotter 40 has an associated needle 42 for assisting in forming an individual loop around a finished bale. When the bale needs tying, the dog clutch 38 connects the knotter 40 and their needles 42 via a drive chain 44 to a source of driving power to initiate the tying operation. As the individual knotters 40 all operate in an identical manner, it suffices to describe the present invention in relation to only one such knotter 40.

The needle 42 is swingably mounted on the bale case 22 by a pivot 46 and is swung back and forth across the bale chamber 26 by a linkage 48, which is activated by the clutch 38. The needle 42 has an "at-home" or rest position fully below the bale case 22 as illustrated in FIG. 1 and a "full-throw" position extending completely across the bale case 22 as illustrated, for example, in FIG. 9. As illustrated most clearly in FIGS. 4 and 18, the tip 50 of needle 42 has an eyelet 52 defined therein by the opposed furcations 54 and 56 of the bifurcated tip 50 in conjunction with a pair of longitudinally spaced, transversely extending rollers 58 and 60. It will be noted that the roller 58 is positioned inwardly from the outer extremity of the tip 50, while the roller 60 is positioned outwardly from the roller 58 more closely adjacent this extremity. Even so, the roller 60 is positioned a short distance inwardly from the outer extremity of the tip 50, and both of the rollers 58 and 60 may be tapered toward their mid points, comparable to a diabolo, so as to provide secure seats for the tying strands.

Figure 2:
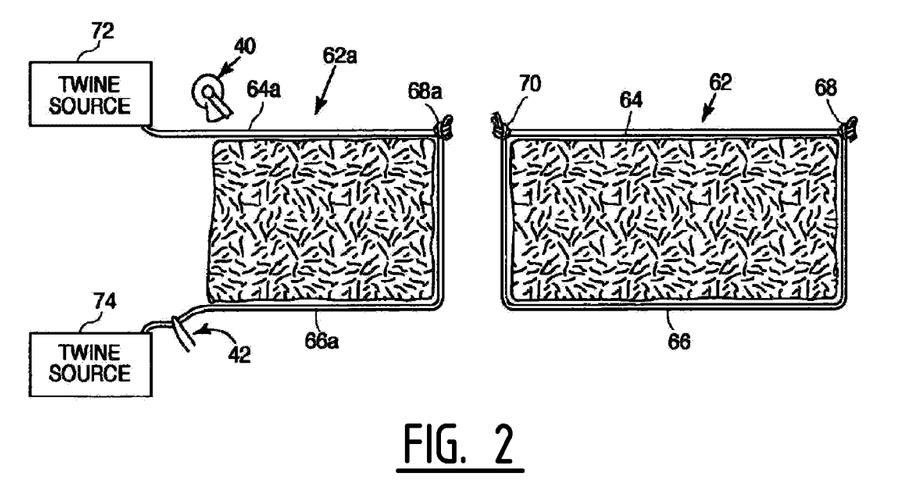
FIG. 2 is a diagrammatic view of a complete and a partial double-knotted loop without the forming of twine tails.

With reference to FIG. 2, to the left of completed loop 62 is a partial loop 62a which is in the process of being formed. The top strand 64a emanates from a source of twine supply 72, while the bottom strand 66a emanates from an entirely separate, second source of twine supply 74. At the particular point in the sequence chosen for illustration, the knot 68a is in existence, and the bale is approaching that length where the needle 42 is ready to swing into operation and present the strands 64a and 66a to the knotter 40 to start an operation cycle in which two consecutive knots are being formed. In a finished bale, the loop 62 is made from two strands of binding material, i.e., one strand 64 along the top side of the bale and a second strand 66 along the bottom side of the bale and its two opposite, vertical ends. The strands 64 and 66 together form the continuous loop 62. Together, they fully circumscribe the bale. The knot 68 of a bale is typically a so called loop-knot. This means that the ends of the strands 64 and 66 of the knot 68 are released from a retained position so they can be pulled back instead of being cut by a moving knife arm 88 as will be described further to form a small loop on top of the knot. The knot 68 itself, thus holds the ends of the strands 64 and 66, united with the knot 68.

With this short explanation in mind, the details of the embodiments according to the present invention will now be described. FIGS. 3A, 3B, 3C, and 3D illustrate a first embodiment according to the invention, and FIGS. 4, 5, 6 and 7 illustrate a second embodiment. For convenience the same reference numerals have been used for referring to similar elements in the different embodiments. The knotter 40 is similar in many respects to the knotter disclosed in EP 1.584.227 in the name of the Applicant, the disclosure of which is herein incorporated by reference.

Figure 3A:
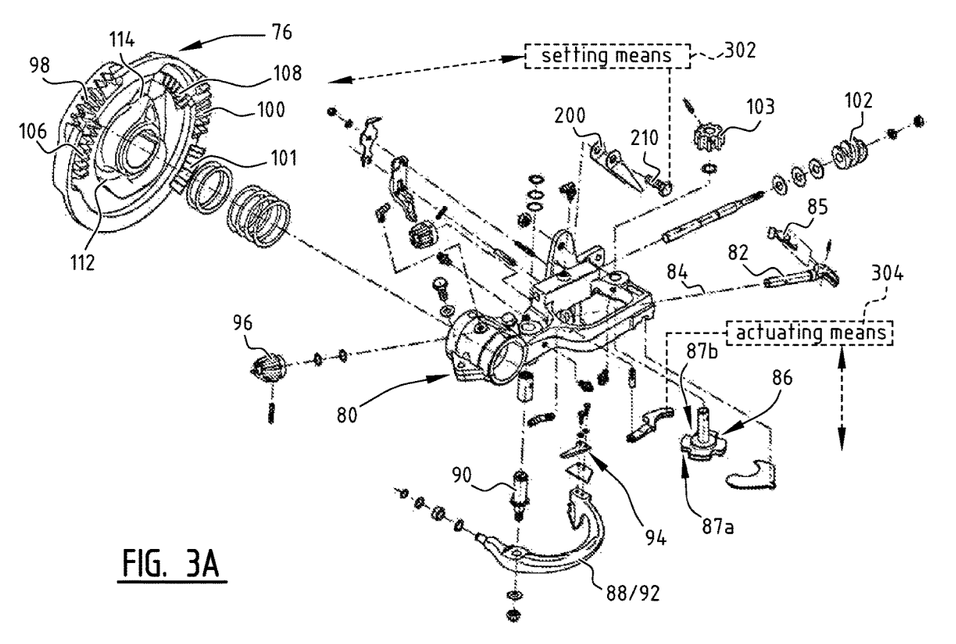
FIG. 3A is an exploded perspective view of an embodiment of the double knotter system of the invention.
Figure 3B:
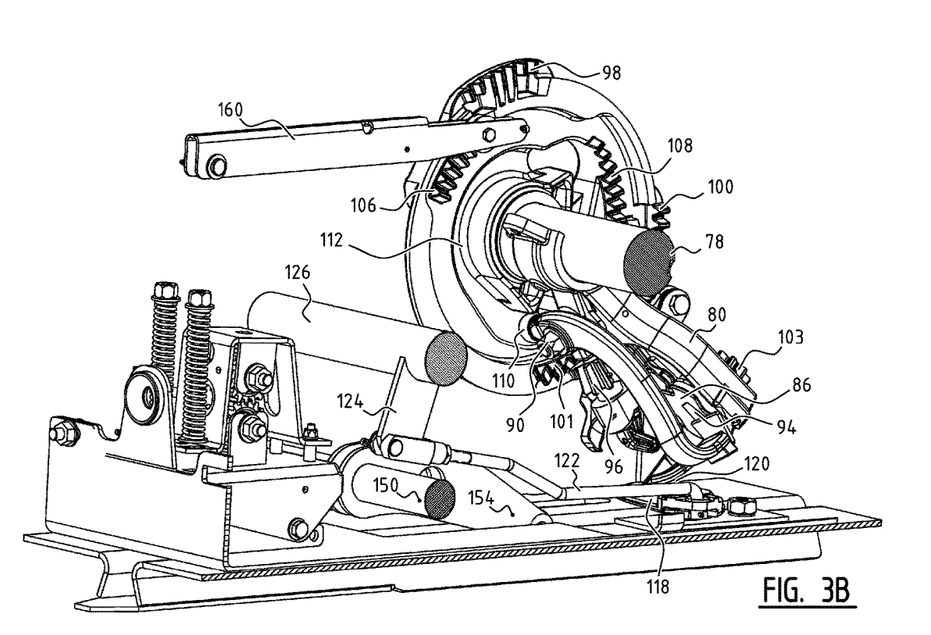
FIG. 3B is an assembled perspective view of the embodiment of the double knotter system of FIG. 3A.
Figure 3C:
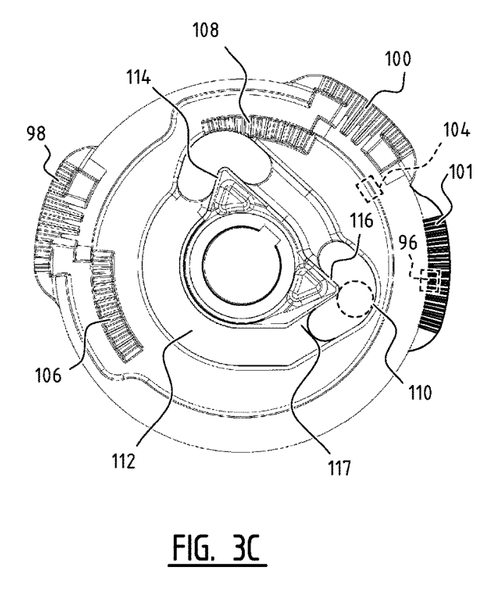
FIG. 3C a detailed view of the knotter disc of the embodiment of FIG. 3A.
Figure 4:
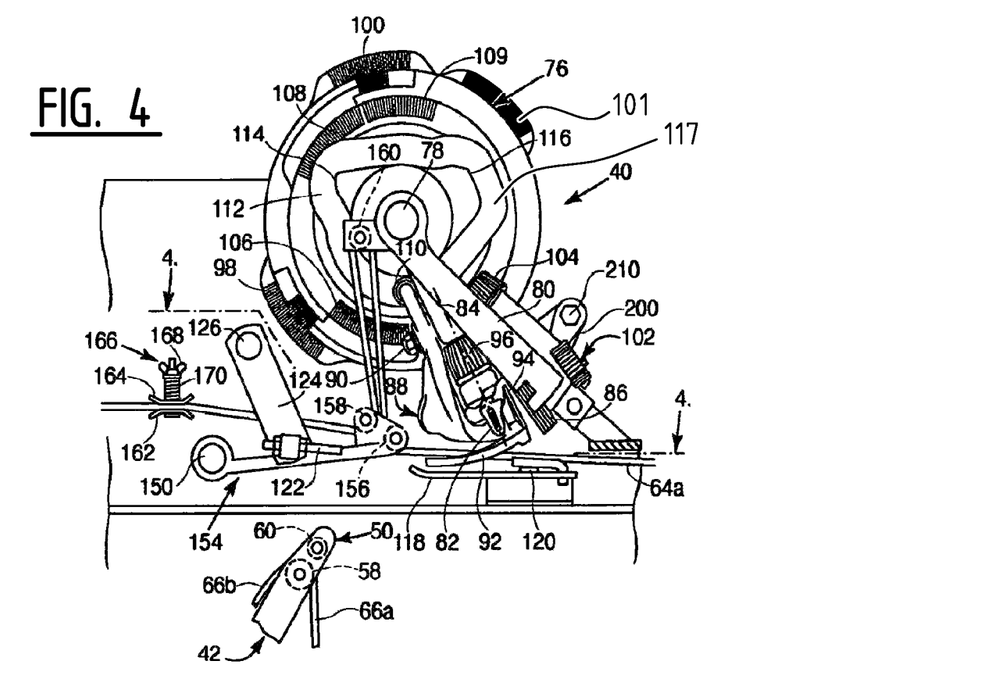
FIG. 4 is an enlarged, fragmentary, side elevational view of the knotter, needle and associated mechanism in mid cycle.

The knotter 40 of FIGS. 3A, 3B and 4 comprises a generally circular element, also called knotter disc 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the knotter components for forming the knots in response to rotation of the knotter disc 76.

Briefly, such components include a rotary bill hook member 82, supported by the frame 80 for rotation about an inclined axis 84; a twine disc 86 rearwardly of and adjacent to the bill hook 82 for holding strands 64a and 66a in position for engagement by the bill hook 82 during rotation of the latter; and removal means 92 for sweeping the connected strands from the bill hook 82 connected to an arm 88 pivotally attached to the frame 80 by a bolt 90. The strands 64a and 66a are held in notches 87a, 87b in the rotating twine disc 86 by a retainer or twine holder 220. The tensioning force of this retainer 220 to the twine disc 86 can be adjusted manually by changing the tension of a leafspring 200 when a bolt 210 is loosened or tightened.

The lower end of the arm 88 is shaped in such a way that it opens away from the twine disc 86 beneath the bill hook 82. The arm 88 further carries a knife 94 between the bill hook 82 and the twine disc 86 for severing the strands 64a and 66a in response to a swinging movement of the arm 88 in the proper direction. Such movement of the arm 88 to operate the knife 94 also serves to bring the removal means 92 in engagement with a knot formed on the bill hook 82 for stripping such knot off of the bill hook 82. The removal means 92 preferably have a shape which is substantially complementary to the shape of the bill hook 82 to improve this sweeping of the bill hook.

In order to transmit driving power to the bill hook 82, the knotter disc 76 is provided with a pinion 96 which is disposed for meshing engagement with a pair of circumferentially spaced gear stretches 98, 100 and 101 on the knotter disc 76. Similarly, driving power is transmitted to the discs of the twine disc 86 through, a twine disc pinion 103, a worm gear drive 102 and a bevel gear 104 in position for sequential meshing engagement with a pair of circumferentially spaced gear sections 106, and 108 on the knotter disc 76.

Power to swing the arm 88 about the pivot bolt 90 is obtained through a cam follower 110 at the upper end of the arm 88 beyond the pivot bolt 90 which is disposed within a cam track 112 on the knotter disc 76. A pair of circumferentially spaced cam shoulders 114 and 116 in the track 112 are positioned to sequentially engage the follower 110 to operate the latter.

Figure 7:
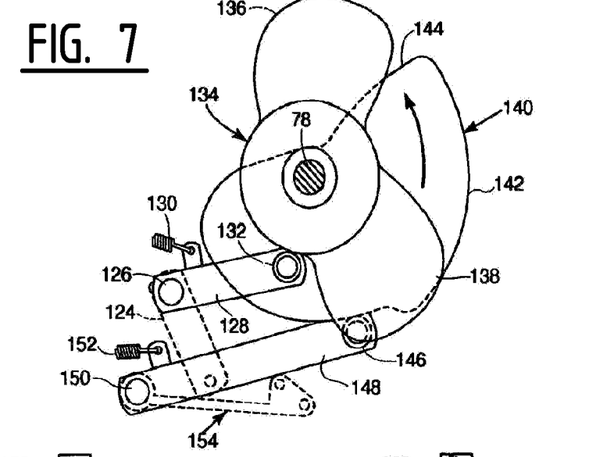
FIG. 7 is a fragmentary, elevational view of cams on a drive shaft of the knotter for operating a slack take-up arm and a twine finger.

A finger 118 is located below the bill hook 82 and the arm 88 of the knotter 40 and is mounted on an upright pivot 120 for lateral swinging movement between a standby position illustrated in FIGS. 4 and 5 and a full-throw, laterally extended position somewhat beyond that illustrated in FIG. 6. An operating link 122 attached at one end to the finger 118 and at the opposite end to a crank 124 serves to effect swinging of the finger 118. The crank 124 is in turn fixed to a transversely extending shaft 126 that extends to a point behind the knotter disc 76 where it may carry a second crank 128 as illustrated in FIG. 7. The crank 128 is biased upwardly in a counter-clockwise direction by a coil spring 130 and carries a cam follower 132 at its outermost end. The follower 132 is in position for operating engagement with a double-lobed cam 134 fixed to the shaft 78 for rotation therewith, its lobes 136 and 138 being circumferentially spaced apart in accordance with the desired timed relationship between the finger 118 and the knot-forming components of the knotter 40.

Also mounted on the shaft 78 with the cam 134 is a second cam 140 having a peripheral land stretch 142 over approximately 180 degrees of its circumference and a peripheral valley stretch 144 over the remaining approximately 180 degrees of its circumference. Such stretches 142 and 144 are disposed for operating engagement with a cam roller 146 located at the outer end of a lever 148 that is fixed at its inner end to a transverse shaft 150. The lever 148, and hence the shaft 150, are biased in a counter-clockwise direction viewing FIG. 7 by a coil spring 152. The shaft 150 extends back out to the opposite side of the knotter disc 76 parallel with the shafts 78 and 126 to a point substantially in fore-and-aft alignment with the bill hook 82. At that location, the shaft 150 fixedly carries a rearwardly extending slack take-up device 154. The device 154 carries a pair of spaced rollers 156 and 158 at its rearmost end around which the strand 64a is entrained as illustrated in FIG. 4. A length of the strand 64a is also looped upwardly around another roller 160 disposed above the device 154. The strand 64a may be clamped between a pair of opposed plates 162 and 164 (FIG. 4) of a tensioning unit 166. The force with which the plates 162 and 164 clamp the strand 64a may be controlled by a wing nut 168 operating against a spring 170 that in turn presses against the movable plate 164. A tensioning unit similar to unit 166 may also be provided for the strand 66a, although such additional unit is not illustrated.

Figures 5, 6, 18:
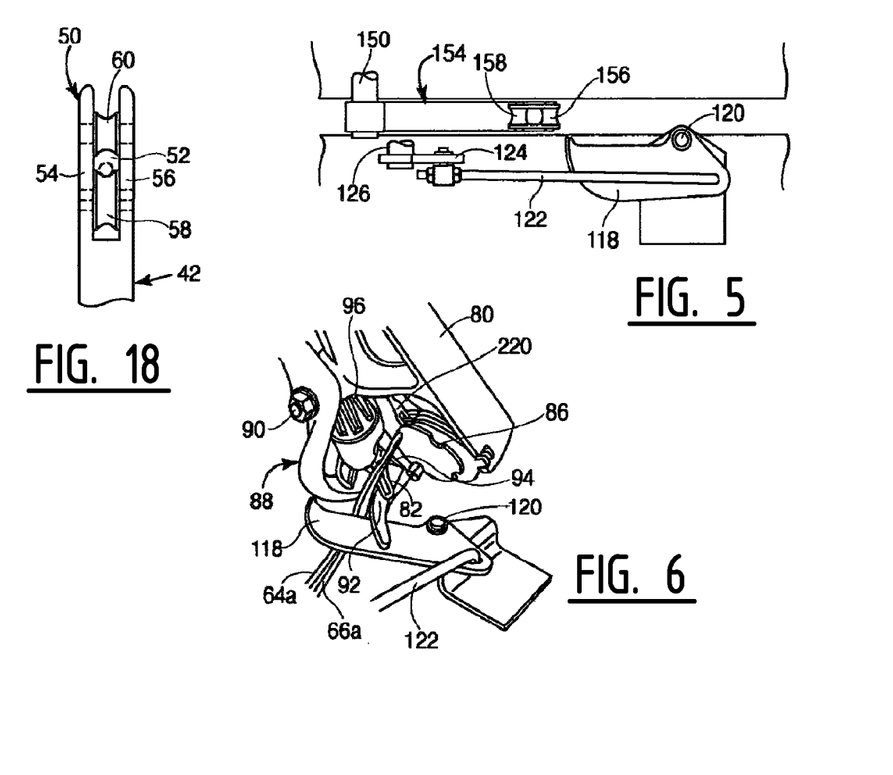
FIG. 5 is a fragmentary, plan view taken substantially along line 4-4 of FIG. 4.
FIG. 6 is a fragmentary, front perspective view of the knotter with strands of twine draped across the bill hook and held by retaining discs in readiness of preparing a knot.
FIG. 18 is an enlarged, front elevational view of the tip of a needle which presents the strands to the knotter, illustrating details of the construction thereof.
Figure 8:
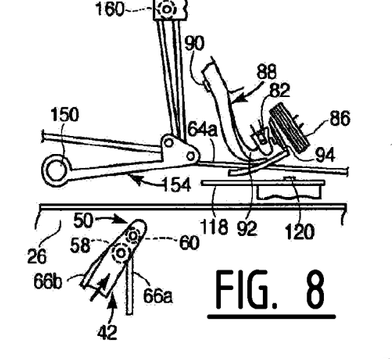
FIGS. 8 to 17 are fragmentary, schematic views illustrating the successive steps of a double-knotting operation.

The condition of the partial loop 62a in FIG. 2, and that of the knotter 40 and the needle 42, corresponds substantially with conditions illustrated in FIGS. 4, 5 and 8, with the exception that in FIG. 2, the needle 42 is still in its home position. At this point in the bale forming operation, the bale has reached its desired length and it is time to complete the loop around the bale and make the second knot in the loop. It is remarked that at this specific instance, the strand 64a stretches along the top of the bale directly beneath the arm 88 but, at least for all effective purposes, is out of contact with the knotter 40. As illustrated in FIG. 8, as the needle 42 swings upwardly toward the knotter 40, it carries with it the strand 66a as the latter is pulled out of source 74. Note that because the strand 66a is threaded through the eyelet 52 of needle 42, a length of that strand on the twine source side of the needle 42 is also carried upwardly toward the knotter 40, such extra length being hereinafter denoted 66b. While the needle 42 approaches the knotter 40, no additional length of the strand 64a is pulled from the source 72. Even as the tip of the needle 42, and more particularly, the roller 60, snares the strand 64a as illustrated in FIG. 9 and presents strands 64a and 66a in unison to the knotter 40, still no additional length of the strand 64a is pulled from source 72 because the device 154 rocks upwardly in a counter-clockwise direction to provide the slack necessary in the strand 64a to accommodate the needle movement.

Figure 9:
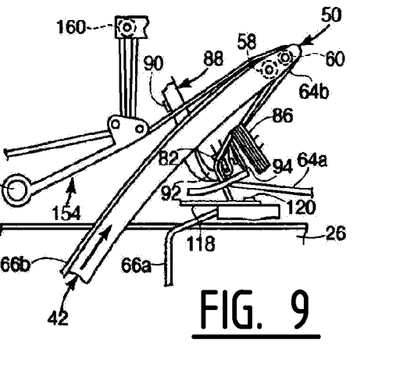
Figure 10:
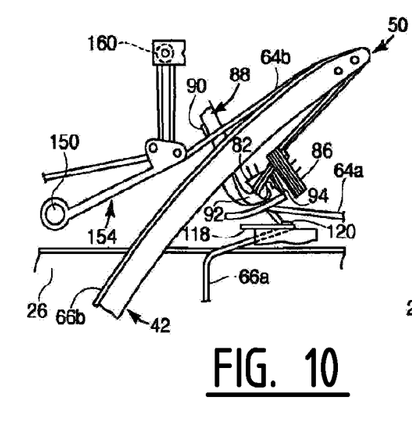

While the strands 64a and 66a are being delivered across the bill hook 82 to the twine disc 86, the finger 118 is actuated to swing inwardly and engage at least the strand 66a as illustrated in FIGS. 9 and 10 so as to assure that the strands 64a and 66a are both in proper position across the bill hook 82. The twine finger will hold the strands 64a, 66a on the bill hook 82 during the whole first knot process.

Figure 11:
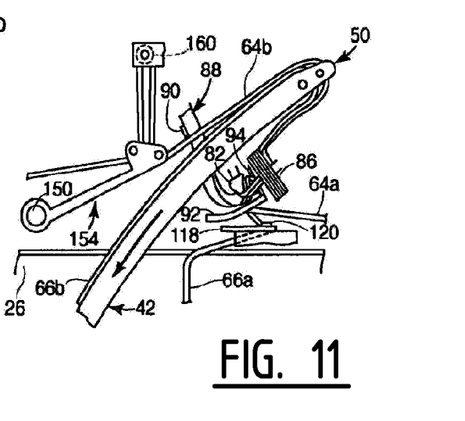
Figure 12:
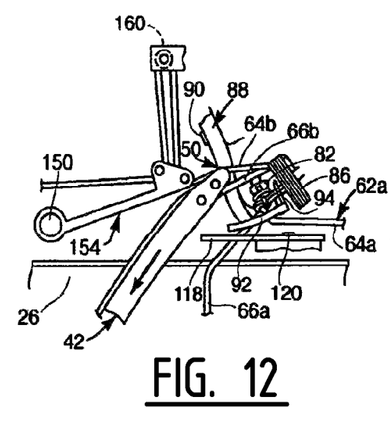

In presenting the strands 64a and 66a, the needle actually drapes the strands across the bill hook 82 and thence into awaiting notches of the twine disc 86, whereupon rotation of co-operating discs in the latter, in combination with a pressing twine holder 220, serve to firmly grip the strands and prevent their escape as the bill hook 82 begins its rotation as illustrated in FIG. 10. The needle 42 reaches its highest position and starts to go down, see FIG. 11. The twine disc 86 rotates a quarter of a turn and clamps the twines 64b and 66b firmly together. During the down travel of the needles the two twines on the back of the needles are placed in the next notch of the twine disc for the second knot (FIG. 12). While the needle goes down, the bill hook rotates to form the first knot. The knife arm swings out to cut the twines under the twine disc and sweeps the knot from the bill hook.

When the bill hook 82 rotates around its axis 84, a cam follower 85, which is connected to the upper lip 83a, engages an element having a cam shoulder (not shown). When rotating, the cam follower will push the upper lip 83a away from the lower lip 83b, thus enabling the strands 64a and 66a to enter in between the two lips 83a and 83b while the bill hook is rotated.

Figure 12A:
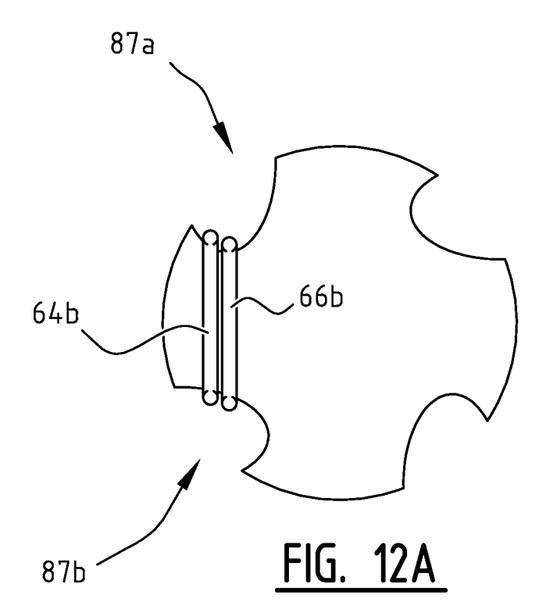

When the needle 42 delivers the strands 64 and 66 to the twine disc 86, the twine disc 86 rotates in such a manner that the strands 64 and 66 are retained twice in different notches 87a, 87b in the twine disc 86, see FIG. 12 and the schematic top view of the twine disc 86 shown in FIG. 12A. By doing so, two knots 70a and 68b can be formed during one knotting cycle as will be explained further, whereby the knife 94 severs the strands 64a and 66a from the strands 64b and 66b after the first knot 70 is formed and the removal part 92 removes the first knot from the bill hook 82, thus separating the two loops from each other. The adjustable leaf-spring 200 pushes against the twine holder 220, thus co-operating with the twine disc 86 to retain the strands.

Figure 13:
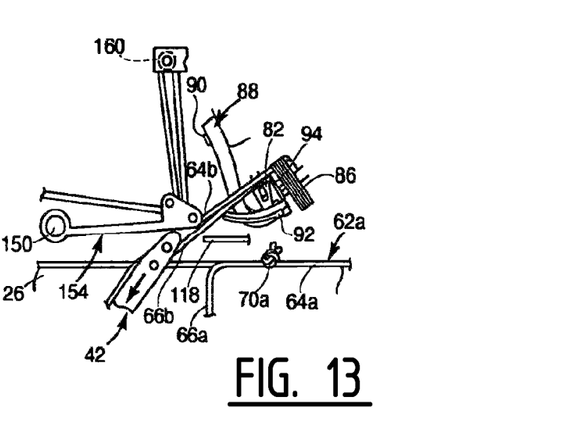

The foregoing described movement on the part of the bill hook 82 and the twine disc 86 are brought about by operable inter-engagement of the gear stretch 98 and gear section 106 on the knotter disc 76 with their respective gears 96 and 104 on the bill hook 82 and the twine disc 86. Such driving inter-engagement continues until a knot has been formed on the bill hook 82 as illustrated in FIGS. 11 and 12, by which time the needle 42 has begun to withdraw. At this point, the cam shoulder 114 of the knotter disc 76 comes into engagement with the roller 110 of the arm 88 so as to swing the bottom of the latter, and hence the knife 94, across that portion of the strands between the bill hook 82 and the twine disc 86, thereby severing the same as illustrated in FIG. 12 and previously explained. At the moment of cutting, the strands 64a and 66a extend from in between the lips 83a and 83b towards the twine disc 86. Considering that the knife 94 moves very closely alongside the bill hook 82, the free ends of the cut strands 64a and 66a extend only over a very short distance out of the lips 83a and 83b. To complete the knot formation, the removal part 92 engages the strands 64a and 66a which are retained in a twisted manner around the bill hook 82. In so doing, the strand parts lying on top of the lip 83a are pulled over the strand parts laying in between the lips 83a and 83b, thereby forming the knot. As described above, since the free ends of the strands 64a and 66a are very short, they are pulled completely through the knot during its final formation, resulting in the so-called conventional knot 70a, as best seen in FIG. 13. Besides completing the knot, further motion of the arm 88 also strips the finished knot 70a completely from the bill hook 82 and drops the completed loop on the bale as illustrated in FIG. 13.

Figure 14:
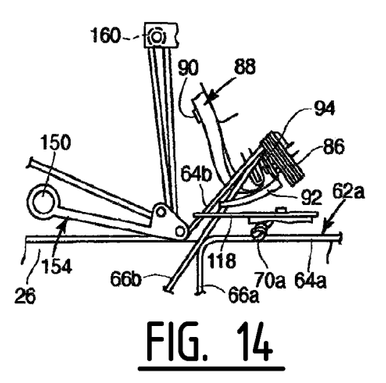
Figure 15:
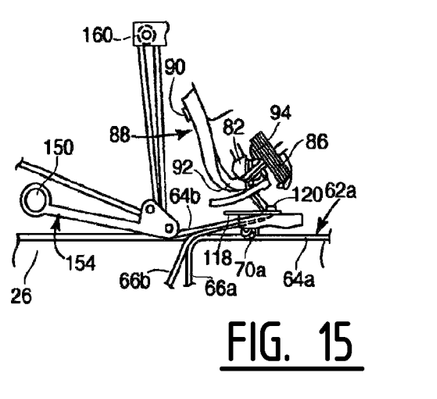

When the knot 70a is dropped by the knotter 40 following severance and stripping from the bill hook 82, the strand 66b from source 74, as well as strand 64b from source 72 is still retained in the second notch 87b and possibly also in the first notch 87a of the twine disc 86. At this instance, the upper lip 83a is open again. Consequently, as the needle 42 continues to retract, the strand 66b is draped downwardly across the bale chamber 26 thereby pushing the upper lip 83a down because of the pressure of the strands on the upper lip 83a, while the slack take-up device 154 lowers to its normal position to pull a small amount of additional twine from the source 72. Upon reaching the condition illustrated in FIG. 14, the strands 64b and 66b are in position for initiating the second tying cycle which is started by the finger 118 swinging inwardly to engage the strands 64b and 66b and to assure that the strands 64b and 66b are properly positioned across and in engagement with the bill hook 82, see FIG. 15, whereupon the latter and the twine disc 86 are operated by their second respective gear stretch 100 and gear section 108 on the knotter disc 76.

Figure 3D:
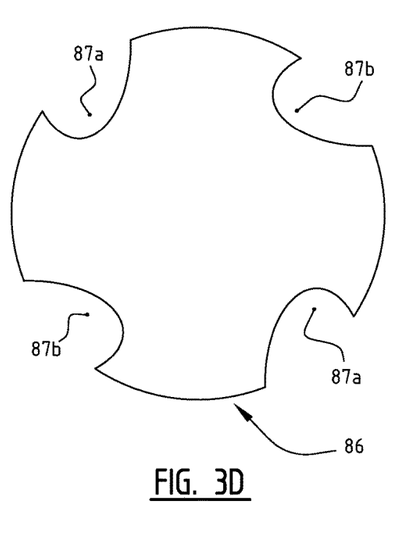
FIG. 3D a schematic view of an embodiment of a twine disc according to the invention.
Figure 16:
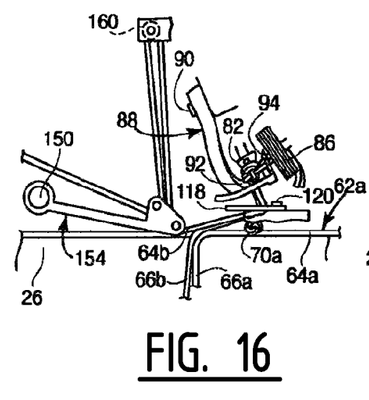

Thus, the second knot 68b becomes formed as illustrated in FIG. 16, whereupon the arm 88 is once again actuated, but this time by the second cam shoulder 116. Preferably the pressure of the twine holder 220 on the twine disc 86 and/or the shape of those elements should be such that a controlled slipping of the strands 64b and 66b is obtained during the formation of the second knot 68b. This may be reached by a suitable form of the twine disc 86, and in particular by a suitable shape of the recess in which the strands 64b and 66b are taken up. FIG. 3D illustrates an example of a possible twine disc having a first type of recess 87a in which the twines can be firmly clamped and a second type of recess 87b in which the twines are allowed to slip. The skilled person will understand that other shapes are possible and that it may be possible to provide more or less recesses in the twine disc. The twine disc could e.g. be provided with two notches spaced along the circumference at an angle which is larger than 90 degrees, in which case the rotation of the twine disc will have to be adapted accordingly.

According to an alternative variant the pressure exerted by the leaf spring 200 could be regulated using a setting means 302 adapted to decrease this pressure when the gear 96 engages gear section 100. According to yet another possibility the twine holder 220 could be pushed away against the force of the leaf spring 200 during the formation of the second knot 68b. The skilled person understands that this regulating of the pressure/pushing away of the twine holder can be reached using any suitable mechanical or hydraulic transfer, e.g. by mechanically coupling the rotation of the knotter disc 76 and the setting means 302 for setting the pressure exerted on the twine holder 220. Also, instead of providing the spring means 200, there could be provided a different actuator 304 for biasing the twine holder 220, which actuator could be regulated e.g. by means of a control device for exerting a lower biasing during the second tying cycle. The operator would then be able to adjust the pressure exerted by the twine holder on the twine disk and the twines which are placed in the twine disk, such that the proper tension can be chosen, depending on e.g. the crops which is being baled, the speed of travel of the machine, the weather conditions, the quality of the twine, . . . . Finally the skilled person understands that an adaption of shape of the recesses 87a, 87b and the use of a biasing means such as 302 or 304 may be combined.

Figure 17:
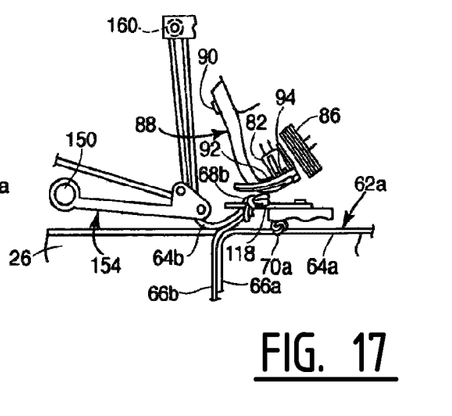
Figure 19:
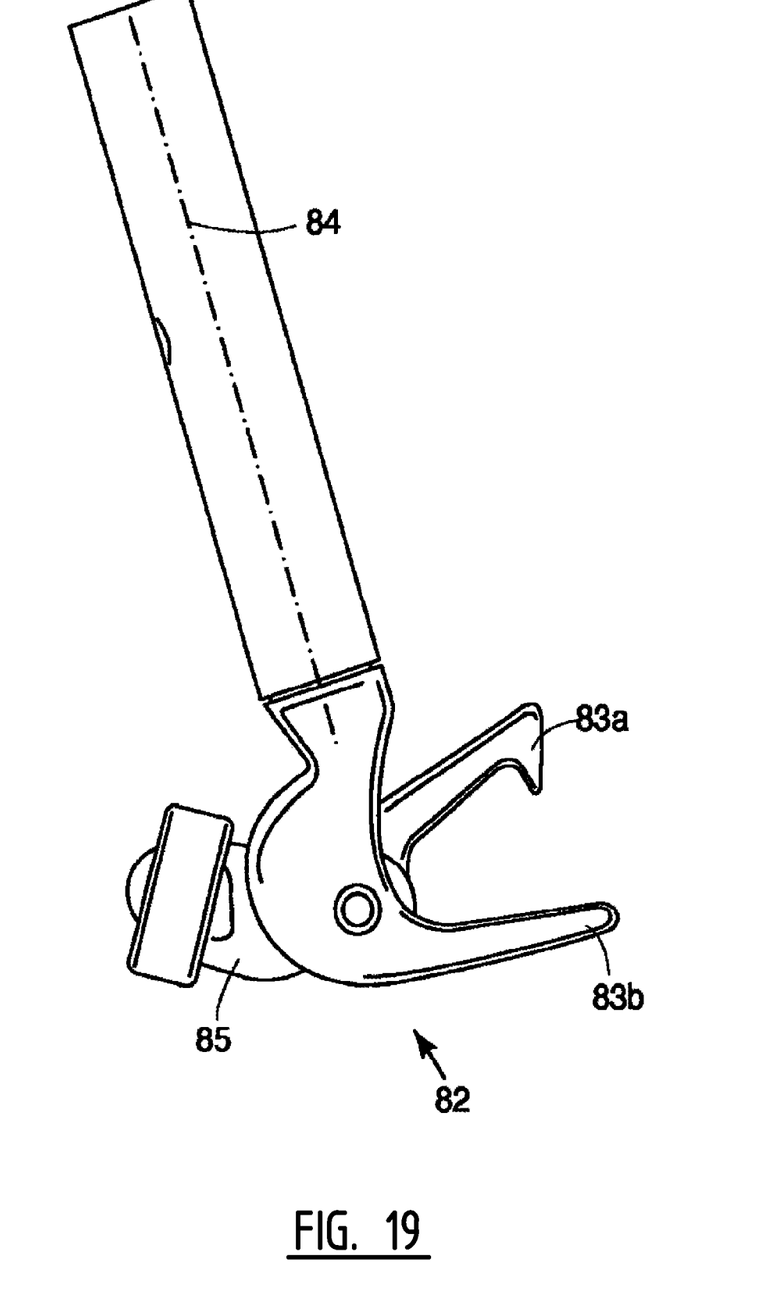
FIG. 19 is an enlarged view of the bill hook which forms the knot by turning around its lengthways axis, illustrating details of construction thereof.

Because the free ends of the strands 64b and 66b are considerably longer than the free ends obtained during the first knot formation, upon finalizing the knot, free ends 64b and 66b no longer are pulled completely out of the knot, resulting in a so-called loop-knot 68b, as best seen in FIG. 17.

The cam shoulder 116 extends over a part of the circumference, see also reference numeral 117 so as to create a large shoulder which keeps the knife 94 in its furthest extended position after removal of the knot 68b of the bill hook 82. This position of the cutter arm 88 is best illustrated in FIG. 3B. Pinion 96 will now engage gear stretch 101 and continue to rotate while the upper lip 83a opens a little. By keeping the cutter arm 88 in its furthest position and continuing to rotate the bill hook 82, it is made sure that the strands can be properly removed and do not remain attached to the bill hook.

As illustrated in FIG. 4, there may be provided a supplementary gear section 109 providing a prolonged operation of the twine disc 86. In that way the strands 64b and 66b will no longer be retained between the twine disc 86 and the twine holder 220, causing a further slipping of the twines during the forming of the second knot. Indeed, even though the knife 94 is very sharp, it will not be able to cut the strands because instead of holding the strands, the twine disc 86 is releasing them on account of the continued rotation of the twine disc 86 and the low pressure of the twine holder 220 on the twine disc 86, while the arm 88 continues moving and stripping of the almost completed knot from the bill hook 82, thus pulling the strands out of the twine disc 86. The skilled person understands that the supplementary gear section 109 is not necessary, and that substantially the same effect can be reached when the tensioning force of the leaf spring 200 to the twine holder 220 is sufficiently decreased.

This knot 68b is the start of a new bight for the next bale. Such bight is in position to receive new material that is packed into the bale chamber 26 by the plunger 30, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 42 to complete the loop around the bale and form the other knot.

While the principles of the invention have been set out above in connection with specific embodiments, it is to be understood that this description is merely made by way of example and not as a limitation of the scope of protection, which is determined by the appended claims.

The invention claimed is:

1. A knotter system comprising:
   a bill hook:
   a twine receiver for holding twines;
   a cutting arm configured for cutting twines between the bill hook and the twine receiver and sweeping a formed knot from the bill hook while moving between a rest position and an extended position;
   a first drive component adapted to make the bill hook perform at least a first full rotation and a second full rotation and to move the cutting arm at least two times from the rest position to the extended position and back during a full operation cycle to form respectively a first and second consecutive knot;
   wherein the twine receiver is adapted to let the twines slip during the second full rotation of the bill hook so that cutting of the twines is avoided when forming the second knot; and
   wherein the first drive component is adapted to maintain the cutting arm in the extended position after the second rotation of the bill hook for a predetermined period which is sufficient to allow removal of the second knot from the bill hook
   wherein the first drive component is adapted such that the bill hook performs a full third rotation during the operation cycle, and to maintain the cutting arm in the extended position during at least a first part of said third rotation.

2. A knotter system comprising:
   a bill hook:
   a twine receiver for holding twines;
   a cutting arm configured for cutting twines between the bill hook and the twine receiver and sweeping a formed knot from the bill hook while moving between a rest position and an extended position;
   a first drive component adapted to make the bill hook perform at least a first full rotation and a second full rotation and to move the cutting arm at least two times from the rest position to the extended position and back during a full operation cycle to form respectively a first and second consecutive knot;
   wherein the twine receiver is adapted to let the twines slip during the second full rotation of the bill hook so that cutting of the twines is avoided when forming the second knot; and
   wherein the first drive component is adapted to maintain the cutting arm in the extended position after the second rotation of the bill hook for a predetermined period which is sufficient to allow removal of the second knot from the bill hook;
   wherein the bill hook comprises a lower lip, an upper lip, and positioning components that position the upper lip with respect to the lower lip; said positioning components being adapted to move the upper lip away from the lower lip during at least a first part of a third rotation.

3. The knotter system of claim 1, wherein said first drive component comprises a pinion and a first, second and third gear stretch provided along the circumference of a disc, said pinion being adapted to cooperate with said first, second and third gear stretch for making the bill hook perform the first, second, and third full rotation respectively when said disc is rotated.

4. The knotter system of claim 3, wherein said first drive component comprises a cam track and a cam follower, said cam follower being connected with the cutting arm, and said cam track being provided in said disc or in a member mounted for rotating synchronously with said disc, and being adapted for moving the cutting arm a first time and a second time from the rest position to the extended position and back, said second time including the predetermined period in the extended position.

5. The knotter system of claim 1, wherein the twine receiver comprises a twine disc and a twine holder, said twine holder being adapted to clamp twines against the twine disc.

6. The knotter system of claim 5, further comprising second drive component adapted for rotating the twine disc during a first turn whilst clamping twines for forming of the first knot, and for rotating the twine disc during a second turn whilst letting twines slip during the forming of the second knot.

7. The knotter system of claim 5, wherein said twine disc is provided with at least a first and a second notch that receives the twines.

8. The knotter system of claim 6, wherein the twines are in a first notch during the first turn and in a second notch during the second turn, and wherein the second notch is shaped in such a way that the twines are allowed to slip out of the second notch during forming of the second knot.

9. The knotter system of claim 5, wherein the twine receiver is provided with a biasing component for setting a bias for the clamping by the twine holder.

10. A knotter system comprising:
a bill hook:
a twine receiver for holding twines;
a cutting arm configured for cutting twines between the bill hook and the twine receiver and sweeping a formed knot from the bill hook while moving between a rest position and an extended position;
a first drive component adapted to make the bill hook perform at least a first full rotation and a second full rotation and to move the cutting arm at least two times from the rest position to the extended position and back during a full operation cycle to form respectively a first and second consecutive knot;
wherein the twine receiver is adapted to let the twines slip during the second full rotation of the bill hook so that cutting of the twines is avoided when forming the second knot; and
wherein the first drive component is adapted to maintain the cutting arm in the extended position after the second rotation of the bill hook for a predetermined period which is sufficient to allow removal of the second knot from the bill hook;
wherein the twine receiver comprises a twine disc and a twine holder, said twine holder being adapted to clamp twines against the twine disc
wherein the twine receiver is provided with a biasing component for setting a bias for the clamping by the twine holder;
wherein said biasing component is adapted to change the first bias used during a first turn to a second bias during a second turn, such that during the first bias the twines are firmly clamped in order to cut the twines and during the second turn the twines are able to slip to prevent cutting of the twines.

11. A knotter system comprising:
a bill hook:
a twine receiver for holding twines;
a cutting arm configured for cutting twines between the bill hook and the twine receiver and sweeping a formed knot from the bill hook while moving between a rest position and an extended position;
a first drive component adapted to make the bill hook perform at least a first full rotation and a second full rotation and to move the cutting arm at least two times from the rest position to the extended position and back during a full operation cycle to form respectively a first and second consecutive knot;
wherein the twine receiver is adapted to let the twines slip during the second full rotation of the bill hook so that cutting of the twines is avoided when forming the second knot; and
wherein the first drive component is adapted to maintain the cutting arm in the extended position after the second rotation of the bill hook for a predetermined period which is sufficient to allow removal of the second knot from the bill hook;
wherein the twine receiver comprises a twine disc and a twine holder, said twine holder being adapted to clamp twines against the twine disc
wherein the twine receiver is provided with a biasing component for setting a bias for the clamping by the twine holder;
wherein the biasing component comprises a biasing spring configured to bias the twine holder against the twine disc, and setting component that automatically sets the bias exerted by the biasing spring to the twine holder.

12. A knotter system comprising:
a bill hook:
a twine receiver for holding twines;
a cutting arm configured for cutting twines between the bill hook and the twine receiver and sweeping a formed knot from the bill hook while moving between a rest position and an extended position;
a first drive component adapted to make the bill hook perform at least a first full rotation and a second full rotation and to move the cutting arm at least two times from the rest position to the extended position and back during a full operation cycle to form respectively a first and second consecutive knot;
wherein the twine receiver is adapted to let the twines slip during the second full rotation of the bill hook so that cutting of the twines is avoided when forming the second knot; and
wherein the first drive component is adapted to maintain the cutting arm in the extended position after the second rotation of the bill hook for a predetermined period which is sufficient to allow removal of the second knot from the bill hook;
wherein the twine receiver comprises a twine disc and a twine holder, said twine holder being adapted to clamp twines against the twine disc
wherein the twine receiver is provided with a biasing component for setting a bias for the clamping by the twine holder;
wherein the biasing component comprises an actuating component that automatically sets the bias for the clamping by the twine holder.

13. The knotter system of claim 12, wherein said cutting arm is provided with a cutter and a removal component that respectively cut twines between the bill hook and the twine receiver and sweeping twines from the bill hook whilst moving from the rest position to the extended position.

* * * * *